US008333270B2

(12) United States Patent
Ji et al.

(10) Patent No.: US 8,333,270 B2
(45) Date of Patent: *Dec. 18, 2012

(54) FLOATING PISTON VALVE OF AMPLITUDE SELECTIVE SHOCK ABSORBER

(75) Inventors: Young Chun Ji, Gyeonggi-do (KR); Kyung Won Park, Gyeonggi-do (KR)

(73) Assignee: Mando Corporation, Gyeonggi-do (KR)

( * ) Notice: Subject to any disclaimer, the term of this patent is extended or adjusted under 35 U.S.C. 154(b) by 647 days.

This patent is subject to a terminal disclaimer.

(21) Appl. No.: 12/503,679

(22) Filed: Jul. 15, 2009

(65) Prior Publication Data

US 2010/0012450 A1  Jan. 21, 2010

(30) Foreign Application Priority Data

Jul. 16, 2008  (KR) .................. 10-2008-0069249

(51) Int. Cl.
*F16F 9/34* (2006.01)
(52) U.S. Cl. ................. 188/322.15; 188/282.8; 188/320
(58) Field of Classification Search ............... 188/282.8, 188/320, 322.15, 282.1, 282.4, 282.5, 282.6, 188/282.9, 283, 317, 322.13, 322.22
See application file for complete search history.

(56) References Cited

U.S. PATENT DOCUMENTS

| 2,792,914 | A | * | 5/1957 | Benard | 188/277 |
| 4,515,252 | A | * | 5/1985 | Hidaka et al. | 188/282.5 |
| 5,570,763 | A | * | 11/1996 | Parejo | 188/282.8 |
| 6,253,889 | B1 | | 7/2001 | Shirley et al. | |
| 6,352,145 | B1 | | 3/2002 | DeMolina et al. | |
| 6,460,664 | B1 | | 10/2002 | Steed et al. | |
| 6,918,473 | B2 | | 7/2005 | Deferme | |
| 6,981,577 | B2 | | 1/2006 | Katayama et al. | |
| 2003/0159897 | A1 | * | 8/2003 | Oliver et al. | 188/322.19 |

FOREIGN PATENT DOCUMENTS

| JP | 55163344 | A | * | 12/1980 |
| JP | 2304229 | A | | 12/1990 |
| JP | 3079831 | A | | 4/1991 |
| JP | 4160242 | A | | 6/1992 |
| JP | 5248474 | A | | 9/1993 |

\* cited by examiner

*Primary Examiner* — Xuan Lan Nguyen

(74) *Attorney, Agent, or Firm* — McDermott Will & Emery LLP

(57) ABSTRACT

A floating piston valve includes an annular valve body having a fluid passing hole formed therein, a pair of upper and lower valve discs respectively mounted on upper and lower sides of the valve body to generate damping force, a pair of upper and lower tripod type leaf valve springs respectively mounted on upper and lower sides of the upper and lower valve discs, and a pair of upper and lower coupling supports coupled to the valve body respectively at upper and lower sides of the upper and lower tripod type leaf valve springs. Each of the coupling supports includes an annular support section and a coupling section at least partially formed on an outer edge of the annular support section and is fastened to the valve body through a portion of an outer edge of the valve body.

2 Claims, 6 Drawing Sheets

FLOATING PISTON VALVE OF AMPLITUDE SELECTIVE SHOCK ABSORBER

BACKGROUND

1. Technical Field

The present disclosure relates to a floating piston valve of a shock absorber damping vibrations transmitted from a road surface to a vehicle and, more particularly, to a floating piston valve of an amplitude selective shock absorber that provides a low-damping force characteristic in response to input of high frequency vibrations, which have low amplitudes and occur frequently, thereby enhancing ride comfort of a vehicle.

2. Description of the Related Art

In general, a vehicle is provided with a suspension system for enhancing ride comfort by absorbing or relieving impacts or vibrations transmitted from a road surface to an axle while traveling on the road. One component of the suspension system is a shock absorber. The shock absorber is disposed between the axle and a vehicle body, and includes a cylinder and a piston rod reciprocating in the cylinder. The cylinder is filled with a damping fluid such as gas or oil, which is moved by a piston valve secured to one end of the piston rod to generate a damping force.

As such, a conventional shock absorber has a restriction in that it exhibits predetermined damping force characteristics according to variation of a road state or a driving posture of a vehicle. In other words, a low damping force characteristic can improve driving comfort of the vehicle, but cannot maintain a stable driving posture thereof. Conversely, a high damping force characteristic can maintain the stable driving posture of the vehicle, but entails deterioration in ride comfort. As such, the conventional shock absorber is incapable of controlling damping force characteristics in response to variation of the road state or the driving posture of the vehicle.

In order to solve the problem of such a conventional shock absorber, an existing amplitude selective shock absorber has been developed to provide variable damping force characteristics according to displacement of the piston rod.

FIG. 1 is a cross-sectional view of a portion of a conventional amplitude selective shock absorber capable of providing variable damping force characteristics according to displacement of a piston rod.

Referring to FIG. 1, the existing amplitude selective shock absorber includes a cylinder 10, a piston rod 20 axially reciprocating within the cylinder 10, a stationary piston valve 30 fixedly mounted on the piston rod 20 to divide a space of the cylinder 10 into a rebound chamber and a compression chamber, and a floating piston valve 40 mounted on the piston rod 20 to move in an axial direction in the rebound chamber.

A stopper 50 is secured to the piston rod 20 above the floating piston valve 40. A return spring 60 and a stop spring 70 are interposed between the floating piston valve 40 and the stationary piston valve 30 and between the floating piston valve 40 and the stopper 50, respectively.

As clearly shown in FIGS. 2 and 3, in the conventional amplitude selective shock absorber, the floating piston valve 40 includes an annular valve body 41 having fluid passage holes 41a; a pair of upper and lower valve discs 43 mounted on upper and lower sides of the valve body 41 to generate a damping force, respectively; a pair of upper and lower coil-wave type valve springs 45 mounted on upper and lower sides of the upper and lower valve discs 43 to compress the valve discs 43, respectively; and a pair of upper and lower coupling supports 47 coupled to the valve body 41 through an upper side of the upper coil-wave type valve spring 45 and a lower side of the lower coil-wave type valve spring 45 to hold the valve discs 43 and the coil-wave type valve springs 45 between the coupling supports 47 and the valve body 41, respectively.

Conventionally, each of the coupling supports 47 is composed of an annular support section 47a and coupling sections 47b formed on an overall inner edge of the annular support section 47a. When coupled to the valve body 41, the coupling sections 47b are inserted into an inner diameter of the valve body 41 while adjoining the inner diameter of the valve body 41, so that the inner diameter of the valve body 41 inevitably increases corresponding to the thicknesses of the coupling sections 47b of the coupling support 47. Accordingly, an interface between an annular section of the valve body 41 and the annular support section 47a of the coupling support 47 is decreased in area by an increased amount of the inner diameter of the valve body 41, so that the widths of the valve discs 43 are decreased by the increased amount of the inner diameter of the valve body 41. As a result, as valve springs to be disposed between the valve body 41 and the coupling supports 47 to compress the valve discs 43, the conventional floating piston valve employs the coil-wave type valve springs 45 which are expensive and require a narrow mounting area instead of tripod type leaf valve springs which are inexpensive and require a large mounting area.

BRIEF SUMMARY

According to one embodiment, a floating piston valve of an amplitude selective shock absorber is configured to provide sufficient space for mounting an inexpensive tripod type leaf valve spring between a valve body and a coupling support.

According to one aspect, there is provided a floating piston valve of a shock absorber capable of varying damping force characteristics according to displacement of a piston rod. The floating piston valve includes an annular valve body having a fluid passing hole formed therein, a pair of upper and lower valve discs respectively mounted on upper and lower sides of the valve body to generate damping force, a pair of upper and lower tripod type leaf valve springs respectively mounted on an upper side of the upper valve disc and a lower side of the lower valve disc to compress the valve discs, and a pair of upper and lower coupling supports coupled to the valve body respectively at an upper side of the upper tripod type leaf valve spring and a lower side of the lower tripod type leaf valve spring to hold the valve discs and the tripod type leaf valve springs between the coupling supports and the valve body. In one aspect, each of the coupling supports includes an annular support section and a coupling section partially formed on an outer edge of the annular support section and is fastened to the valve body through a portion of an outer edge of the valve body.

DETAILED DESCRIPTION

Hereinafter, example embodiments will be described with reference to accompanying drawings in FIGS. 4-7.

Figure 1:
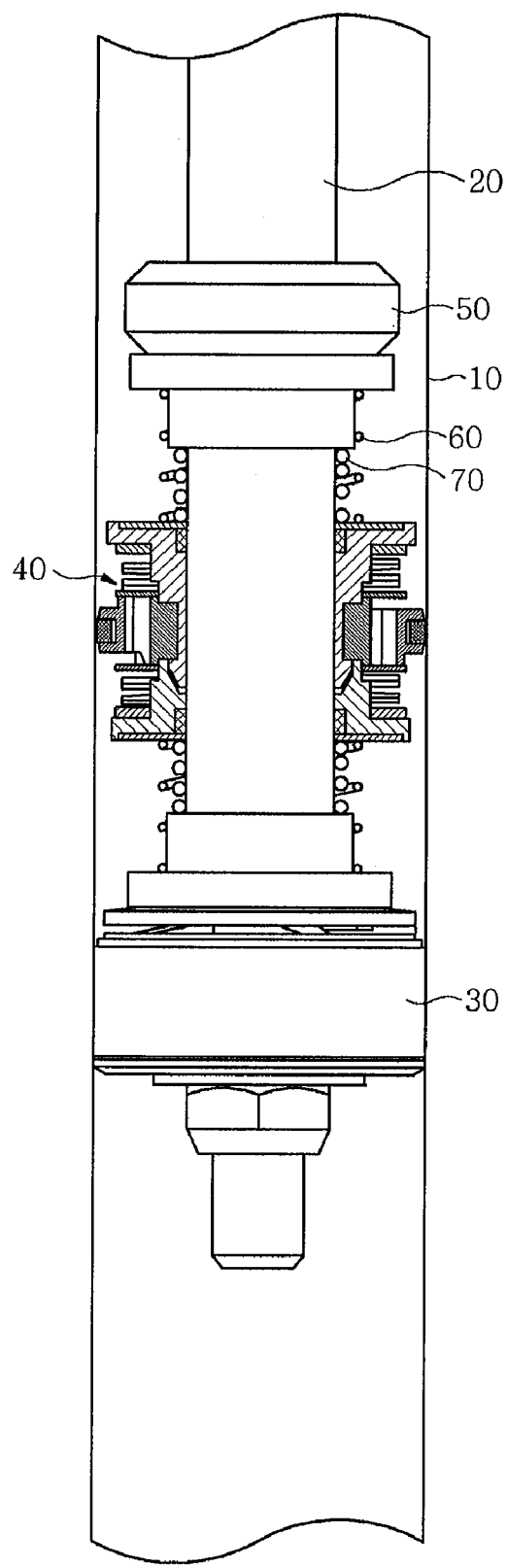
FIG. 1 is a partial cutaway view of a portion of an amplitude selective shock absorber capable of providing variable damping force characteristics according to displacement of a piston rod according to prior art.
Figure 2:
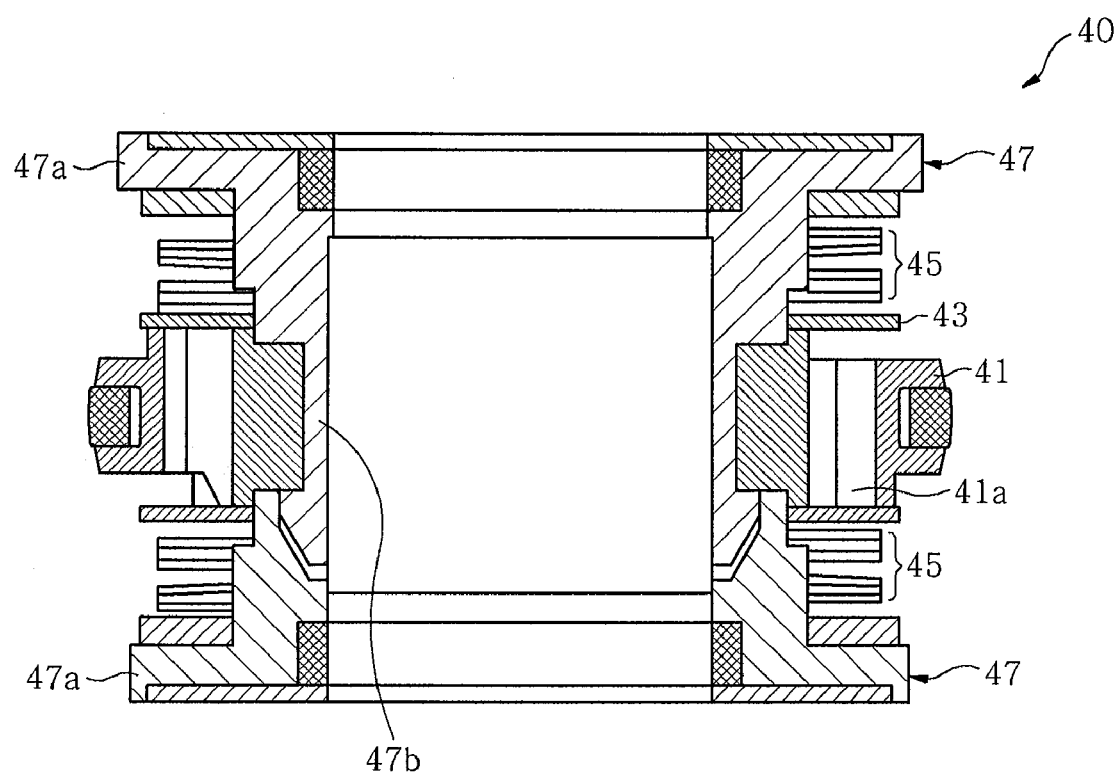
FIG. 2 is a side cross-sectional view of a floating piston valve of the amplitude selective shock absorber of FIG. 1.
Figure 3:
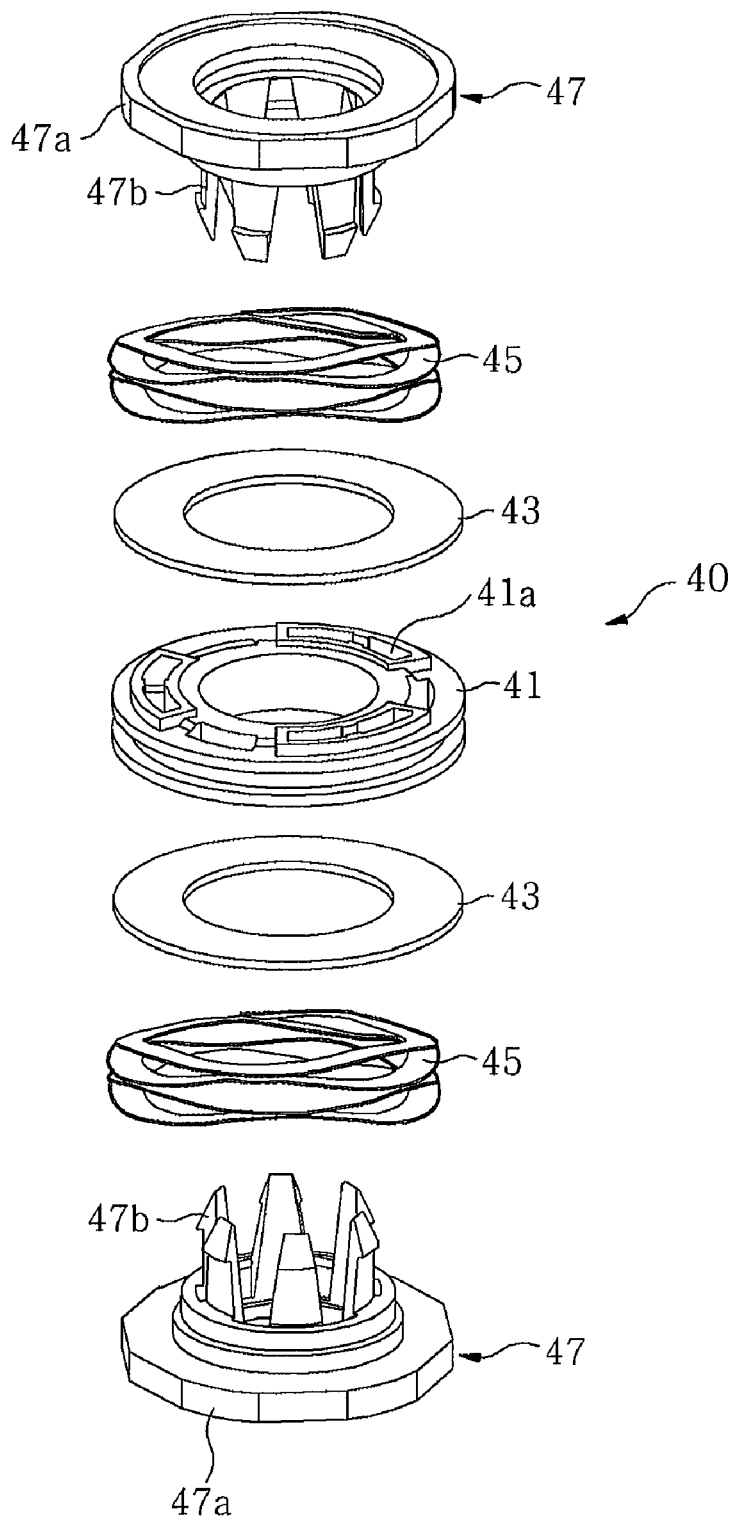
FIG. 3 is an exploded isometric view of the floating piston valve of the amplitude selective shock absorber of FIG. 1.
Figure 4:
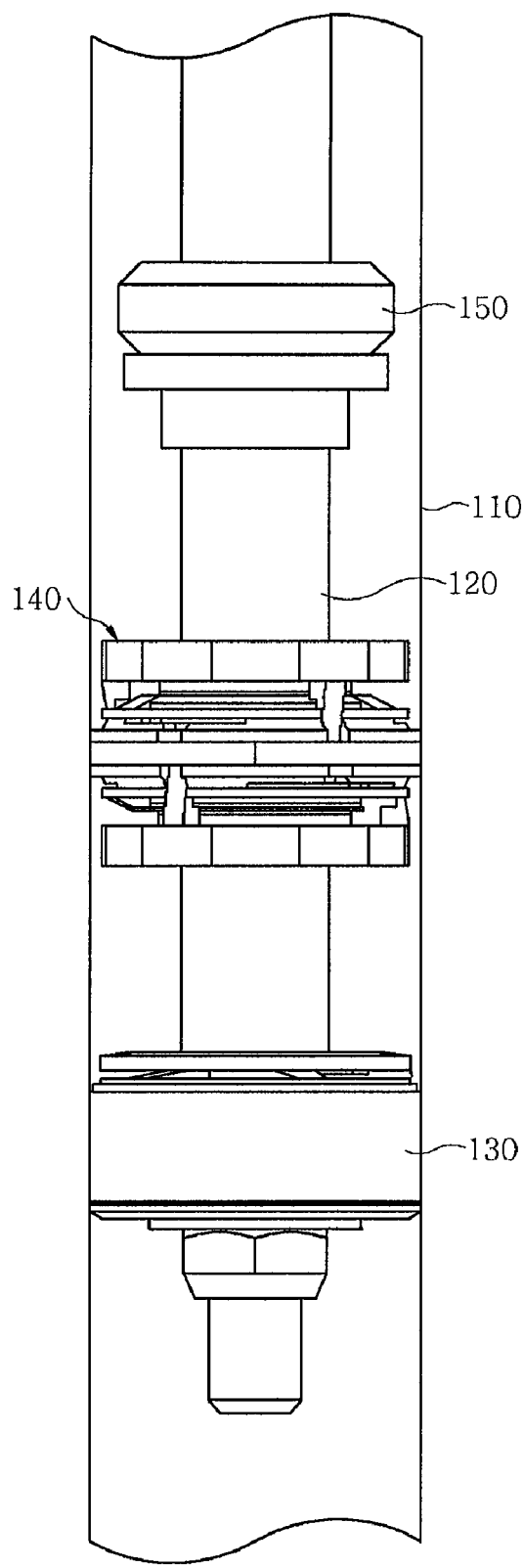
FIG. 4 is a partial cutaway view of a portion of an amplitude selective shock absorber according to one embodiment.

FIG. 4 illustrates a portion of an amplitude selective shock absorber according to one embodiment. As shown therein, the amplitude selective shock absorber includes a cylinder 110, a piston rod 120 configured to axially reciprocate within the cylinder 110, a stationary piston valve 130 fixedly mounted on the piston rod 120 to divide a space of the cylinder 110 into a rebound chamber and a compression chamber, a floating piston valve 140 mounted on the piston rod 120 to move in an axial direction inside the rebound chamber, and a stopper 150 secured to the piston rod 120 above the floating piston valve 140. In FIG. 4, a return spring and a stop spring are not shown.

Figure 5:
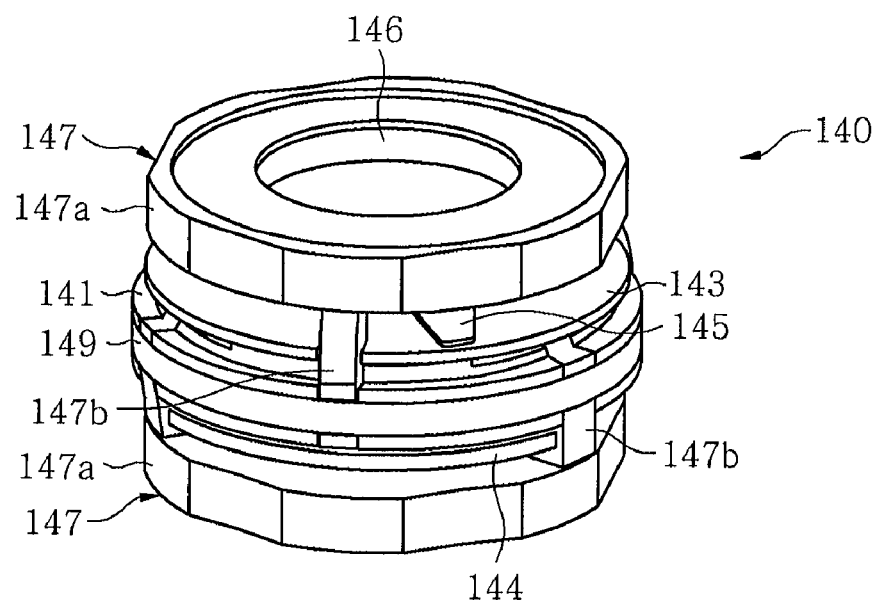
FIG. 5 is an isometric view of a floating piston valve of an amplitude selective shock absorber according to one embodiment.
Figure 6:
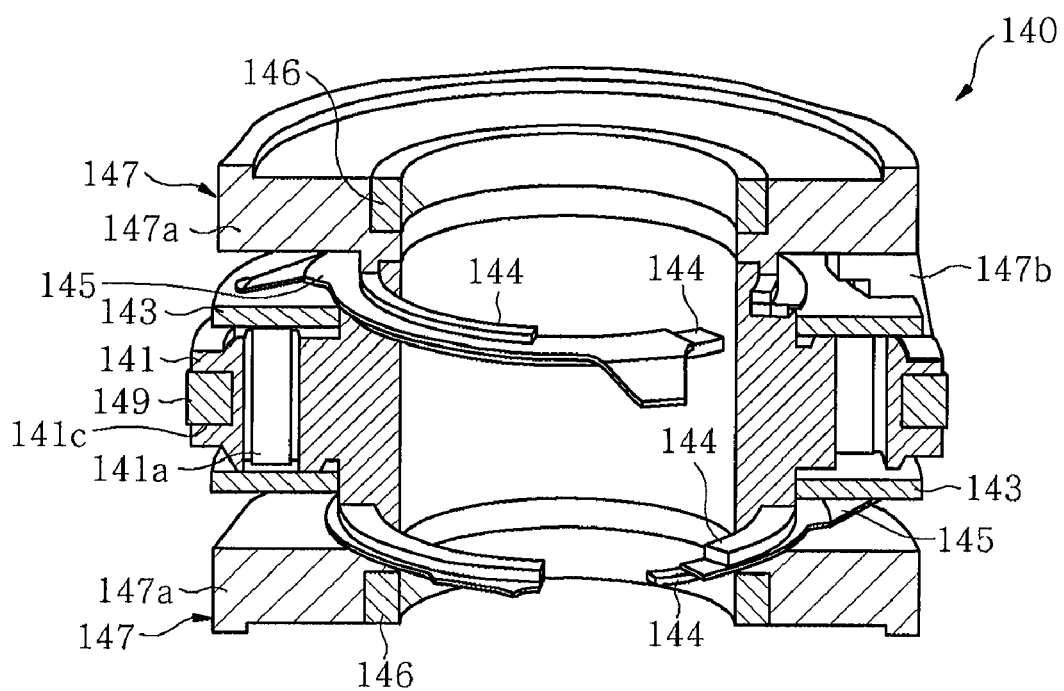
FIG. 6 is a partial cross-sectional isometric view of the floating piston valve of FIG. 5.
Figure 7:
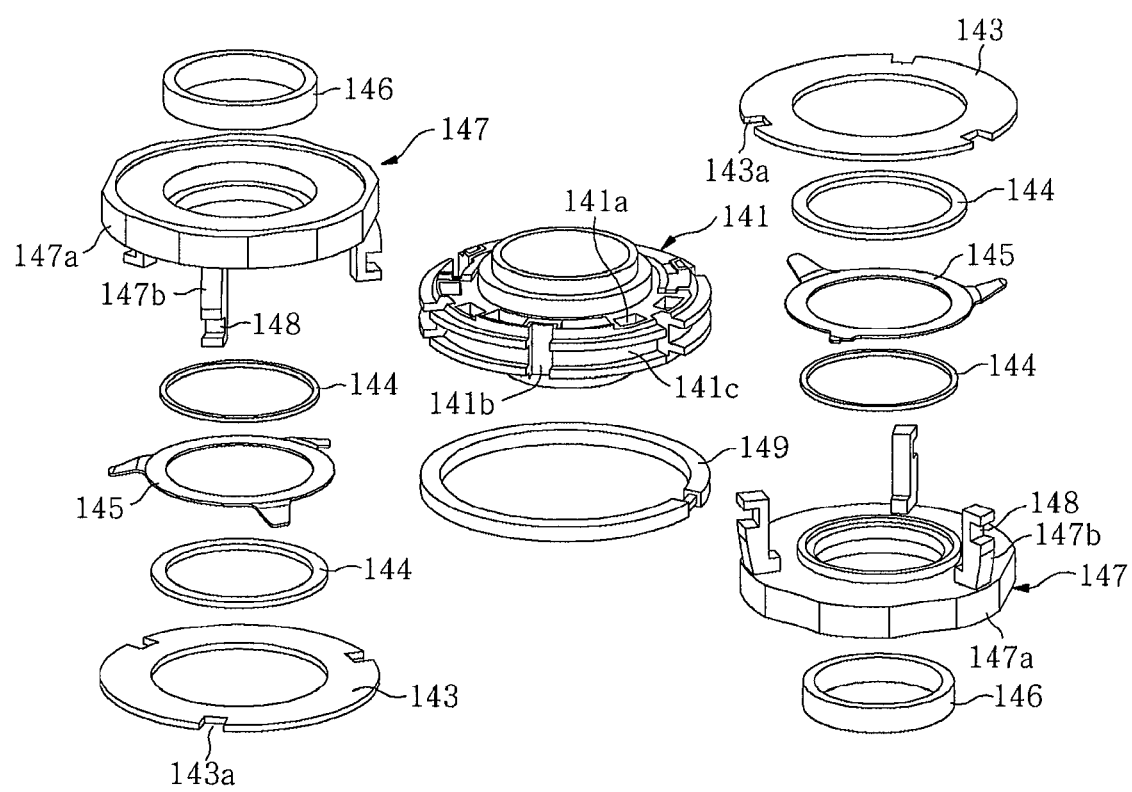
FIG. 7 is an exploded isometric view of the floating piston valve of FIG. 5.

FIG. 5 illustrates a floating piston valve of an amplitude selective shock absorber according to one embodiment, FIG. 6 is a partial cross-sectional view of the floating piston valve of FIG. 5, and FIG. 7 is an exploded view of the floating piston valve of FIG. 5. As shown therein, the floating piston valve 140 includes an annular valve body 141, a pair of upper and lower valve discs 143, a pair of upper and lower tripod type leaf valve springs 145, and a pair of upper and lower coupling supports 147.

The annular valve body 141 is formed with fluid passage holes 141a through which a fluid passes towards above and below the floating piston valve 140.

The upper and lower valve discs 143 are mounted on upper and lower sides of the valve body 141 to generate a damping force, respectively.

In one embodiment, the upper and lower tripod type leaf valve springs 145 are mounted on an upper side of the upper valve disc 143 and a lower side of the lower valve disc 143 to compress the valve discs 143, respectively.

In one embodiment, the upper and lower coupling supports 147 are coupled to the annular valve body 141 through an upper side of the upper tripod type leaf valve spring 145 and a lower side of the lower tripod type leaf valve spring 145 to hold the valve discs 143 and the tripod type leaf valve springs 145 between the coupling supports 147 and the valve body 141, respectively.

Each of the coupling supports 147 can include an annular support section 147a and coupling sections 147b partially formed on an outer edge of the annular support section 147a.

In one embodiment, the coupling sections 147b are fastened to the valve body 141 through portions of an outer edge of the valve body 141 by a coupling ring 149.

For example, the annular valve body 141 can be formed on an outer peripheral surface thereof with longitudinal insertion grooves 141b for the coupling sections, through which the coupling sections 147b are inserted into and pass, respectively.

Further, each of the valve discs 143 can be formed on an outer peripheral surface thereof with insertion grooves 143a for the coupling sections, through which the coupling sections 147b are inserted into and pass, respectively.

In one embodiment, each of the coupling sections 147b is formed on an outer surface thereof with an insertion groove 148 for the coupling ring, into which the coupling ring 149 is inserted.

In one embodiment, the annular valve body 141 is formed on an outer peripheral surface thereof with an outer peripheral insertion groove 141c for the coupling ring, into which the coupling ring 149 is inserted.

The outer peripheral surface of the coupling ring 149 is in close contact with an inner peripheral surface of the cylinder 110, and a Teflon band (not shown) is attached to an outer peripheral surface of the coupling ring 149 to allow the stationary piston valve 130 to move up and down with respect to the inner peripheral surface of the cylinder 110 while sealing a gap between the outer peripheral surface of the coupling ring 149 and the inner peripheral surface of the cylinder 110.

According to one embodiment, the coupling sections 147 partially formed on the outer edge of the annular support 147a of the coupling support 147 are fastened to the valve body 141 through portions of the outer edge of the valve body 141, so that the inner diameter of the valve body 141 is neither increased by the thicknesses of the coupling sections 147c of the coupling support 147 nor is the inner diameter of the valve body 141 decreased by the thicknesses of the coupling sections 147c of the coupling support 147. Accordingly, an interface between an annular section of the valve body 141 and the annular support section 147a of the coupling support 147 is not decreased, so that the width of the valve disc 43 is not decreased. As a result, as a valve spring to be disposed between the valve body 141 and each of the coupling supports 147 to compress the valve disc 143, the floating piston valve may employ the tripod type leaf valve spring which is inexpensive and requires a large mounting area.

Further, the tripod type leaf valve spring 145 may be provided at upper and lower sides thereof with washers 144 for adjusting the damping force, respectively.

The annular support 147a of the coupling support 147 may be provided therein with a guide ring 146.

As apparent from the above description, according to embodiments of the invention, the floating piston valve of an amplitude selective shock absorber has coupling sections of coupling supports fastened to the annular valve body through portions of an outer edge of a valve body to prevent a decrease in width of the valve body and valve discs, so that the floating piston valve can employ tripod type leaf valve springs, which are inexpensive and require large mounting areas, as valve springs to be disposed between the valve body and the coupling supports to compress the valve discs.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to [insert list], are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A floating piston valve of a shock absorber capable of varying damping force characteristics according to a displacement of a piston rod, comprising:
   an annular valve body having a fluid passing hole formed therein;
   a pair of upper and lower valve discs respectively mounted on upper and lower sides of the valve body configured to generate a damping force;
   a pair of upper and lower tripod type leaf valve springs respectively mounted on an upper side of the upper valve disc and a lower side of the lower valve disc, and configured to compress the valve discs; and
   a pair of upper and lower coupling supports coupled to the valve body respectively at an upper side of the upper tripod type leaf valve spring and a lower side of the lower tripod type leaf valve spring, and configured to hold the valve discs and the tripod type leaf valve springs between the coupling supports and the valve body,
   wherein each of the coupling supports includes an annular support section and a coupling section partially formed on an outer edge of the annular support section and is fastened to the valve body through a portion of an outer edge of the valve body,
   the coupling section is fastened to the valve body by a coupling ring, and
   a longitudinal insertion groove, through which the coupling section is inserted, is formed on an outer peripheral surface of the annular valve body.

2. The floating piston valve of claim 1, wherein a coupling section-insertion groove, through which the coupling section is inserted, is formed on an outer peripheral surface of the valve disc,
   a coupling ring-insertion groove, into which the coupling ring is inserted, is formed on an outer surface of the coupling section, and
   an outer-peripheral insertion groove, into which the coupling ring is inserted, is formed on an outer peripheral surface of the annular valve body.

* * * * *